US011506297B2

(12) United States Patent
Sorokin et al.

(10) Patent No.: US 11,506,297 B2
(45) Date of Patent: Nov. 22, 2022

(54) RELIEF VALVE CAVITY

(71) Applicant: Caterpillar Inc., Peoria, IL (US)

(72) Inventors: Mikhail A. Sorokin, Naperville, IL (US); Salik Abdul Syed, Naperville, IL (US); Wesley Thomas Payne, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 17/116,824

(22) Filed: Dec. 9, 2020

(65) Prior Publication Data
US 2022/0178454 A1 Jun. 9, 2022

(51) Int. Cl.
| F15B 13/04 | (2006.01) |
| F16K 17/04 | (2006.01) |
| F16K 17/10 | (2006.01) |
| F16K 27/04 | (2006.01) |
| F16K 11/07 | (2006.01) |

(52) U.S. Cl.
CPC ......... *F16K 17/048* (2013.01); *F16K 17/105* (2013.01); *F16K 27/041* (2013.01); *F16K 11/07* (2013.01); *Y10T 137/8671* (2015.04)

(58) Field of Classification Search
CPC ......... Y10T 137/8671; Y10T 137/8667; F15B 13/0402
See application file for complete search history.

(56) References Cited

U.S. PATENT DOCUMENTS

| 4,217,927 | A | | 8/1980 | Morita | |
| 4,522,373 | A | * | 6/1985 | Shelbourn | F16K 11/0704 137/625.68 |
| 4,941,508 | A | | 7/1990 | Hennessy | |
| 6,212,886 | B1 | * | 4/2001 | Sugiyama | E02F 9/2296 60/422 |
| 6,505,645 | B1 | * | 1/2003 | Pack | F15B 13/0402 137/596.13 |
| 6,769,252 | B2 | | 8/2004 | Smith | |
| 7,258,058 | B2 | | 8/2007 | Smith et al. | |

(Continued)

FOREIGN PATENT DOCUMENTS

| DE | 202011108497 U1 | 3/2013 |
| JP | 2003185044 A | 7/2003 |

(Continued)

OTHER PUBLICATIONS

Written Opinion and International Search Report for Int'l. Patent Appln. No. PCT/US2021/062089, dated Mar. 10, 2022 (12 pgs).

*Primary Examiner* — Robert K Arundale
(74) *Attorney, Agent, or Firm* — Lee & Hayes, PLLC

(57) ABSTRACT

A valve body defines a work passage, a high-pressure channel fluidly connected to the work passage, a tank passage, and a cavity disposed between the high-pressure channel and the tank passage. The cavity fluidly connects the high-pressure channel and the tank passage. The cavity is defined at least in part by a first portion within which a relief valve threadedly engages, a second portion disposed adjacent to the high-pressure channel, and an annulus interposed between the first portion and the second portion. The annulus fluidly connects to the tank passage. A surface area of the relief valve exposed to the annulus is greater than a cross-sectional area of the high-pressure channel.

20 Claims, 8 Drawing Sheets

(56) References Cited

U.S. PATENT DOCUMENTS

| | | | | |
|---|---|---|---|---|
| 2004/0163719 | A1* | 8/2004 | Christensen | E02F 9/2267 |
| | | | | 137/596 |
| 2011/0088789 | A1* | 4/2011 | Ku | F15B 13/0402 |
| | | | | 137/115.01 |
| 2013/0032233 | A1* | 2/2013 | Kim | E02F 9/2239 |
| | | | | 137/625 |
| 2016/0363140 | A1* | 12/2016 | Mizukami | F16K 17/02 |
| 2017/0306989 | A1* | 10/2017 | Coolidge | F16K 11/07 |
| 2017/0307096 | A1* | 10/2017 | Janecke | F16K 17/22 |
| 2017/0350097 | A1* | 12/2017 | Kang | F15B 13/02 |
| 2019/0390690 | A1* | 12/2019 | Biwersi | F16K 11/07 |

FOREIGN PATENT DOCUMENTS

| | | |
|---|---|---|
| JP | 2007078178 A | 3/2007 |
| WO | 2019238682 W | 12/2019 |

\* cited by examiner

RELIEF VALVE CAVITY

TECHNICAL FIELD

The present disclosure relates to a hydraulic valve assembly, and more particularly, to a cavity within a valve body of the hydraulic valve assembly that provides an even distribution of incoming makeup flow from a tank passage.

BACKGROUND

Machines use hydraulic valve assemblies or systems to perform a variety of tasks, such as lifting, braking, and steering. Work ports, relief valves, relief lines, and other fluid delivery components are often included in these assemblies. Relief valves are positioned along the relief line, in a space between the work port and a tank passage fluidly connected to a hydraulic fluid tank. The relief valve provides makeup flow to allow the hydraulic fluid to flow from the tank to the work port when the tank pressure exceeds work port pressure. Additionally, relief valves provide relief flow, such as during thermal expansion of the hydraulic fluid.

Due to the size constraints associated with some applications, relief valves are typically designed to have a relatively small footprint. In such designs, valve seats or other sealing surfaces within the relief valves are machined directly into a valve body of the hydraulic valve assemblies. In some instances, however, improper machining may lead to leakage when valves components are in a closed position. Such leakage reduces the efficiency of the hydraulic valve assembly, and can cause damage to other downstream components over time.

Japanese Patent Application No. 2007078178 (hereinafter referred to as the "the '178 application") describes a system configured to regulate the flow of high-pressure hydraulic oil discharged from a pump. The system described in the '178 application includes a sleeve fluidly connected to a tank-side passage. As explained in the '178 application, during operation, hydraulic oil in the passage is drained to a tank. The system shown in the '178 application also includes a shiftable attachment fluidly connected to the sleeve and configured to regulate the flow of oil returning to the tank-side passage. In particular, when the pressure of the hydraulic fluid flowing into the pump exceeds a preset pressure value, a poppet valve associated with the shiftable attachment permits return oil to flow into the tank-side passage.

Although the system described in the '178 application is configured to regulate flow in high-pressure environments, and includes components that are arranged to provide improved makeup flow, such components suffer from the deficiencies noted above. For instance, the poppet valve and other valves employed by the disclosed system does not provide sufficient makeup and/or relief flow in small and compact places. Additionally, the poppet valve may seat directly against a valve body. As a result, the system described in the '178 application is not configured to minimize leakage nor is the system optimized for use in relatively compact environments, such as in an engine compartment, where space is limited.

The systems and methods described herein are directed toward overcoming one or more of the deficiencies set forth above.

SUMMARY

According to a first aspect, a hydraulic valve assembly includes a valve body. The valve body defines a first work passage configured to fluidly connect to a pump, where the first work passage includes a first attachment port configured to fluidly connect to a first hydraulic line, and a second work passage configured to fluidly connect to the pump, where the second work passage includes a second attachment port configured to fluidly connect to a second hydraulic line. The valve body further defines a first tank passage and a second tank passage, where the first tank passage and the second tank passage are configured to fluidly connect to a fluid tank, a first cavity having a first annulus fluidly connected to the first tank passage, and a second cavity having a second annulus fluidly connected to the second tank passage. Further, the valve body defines a first high-pressure channel fluidly connected to the first work passage and the first cavity, and a second high-pressure channel fluidly connected to the second work passage and the second cavity. The hydraulic valve assembly further includes a first relief valve having a first distal end at least partly disposed in the first high-pressure channel and a first proximal end disposed external to the valve body. The first relief valve includes a first surface area exposed to the first annulus of the first cavity, where the first surface area of the first relief valve is at least two times greater than a first cross-sectional area of the first high-pressure channel. Additionally, the hydraulic valve assembly includes a second relief valve having a second distal end at least partly disposed in the second high-pressure channel and a second proximal end disposed external to the valve body The second relief valve includes a second surface area exposed to the second annulus, where the second surface area of the second relief valve is at least two times greater than a second cross-sectional area of the second high-pressure channel.

According to a further aspect, a valve body includes a work passage, a high-pressure channel fluidly connected to the work passage, a tank passage, and a cavity disposed between the high-pressure channel and the tank passage. The cavity fluidly connects the high-pressure channel and the tank passage. The cavity includes a first portion within which a relief valve threadedly engages, a second portion disposed adjacent to the high-pressure channel, and an annulus at least partly disposed between the first portion and the second portion. The annulus fluidly connects to the tank passage. A surface area of the relief valve exposed to the annulus is at least two times greater than a cross-sectional area of the high-pressure channel.

According to a further aspect, a valve assembly includes an attachment point for a hydraulic line, a valve, and a valve body. The valve body defines a work passage fluidly connected to the attachment point. A cavity fluidly connects to the work passage via a high-pressure channel, the cavity includes an annulus, and a tank passage fluidly connects to the cavity via the annulus. The valve is disposed in the cavity such that a surface area of the valve is exposed to the annulus. The surface area of the valve exposed to the annulus is at least two times greater than a cross-sectional area of the high-pressure channel.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

In some examples, the hydraulic valve assembly may provide pressurized hydraulic fluid to work implements that fluidly connect to the hydraulic valve assembly at the one or more hydraulic attachment ports. Relief valves provide relief flow and/or makeup flow of the pressurized hydraulic fluid.

Figure 1:
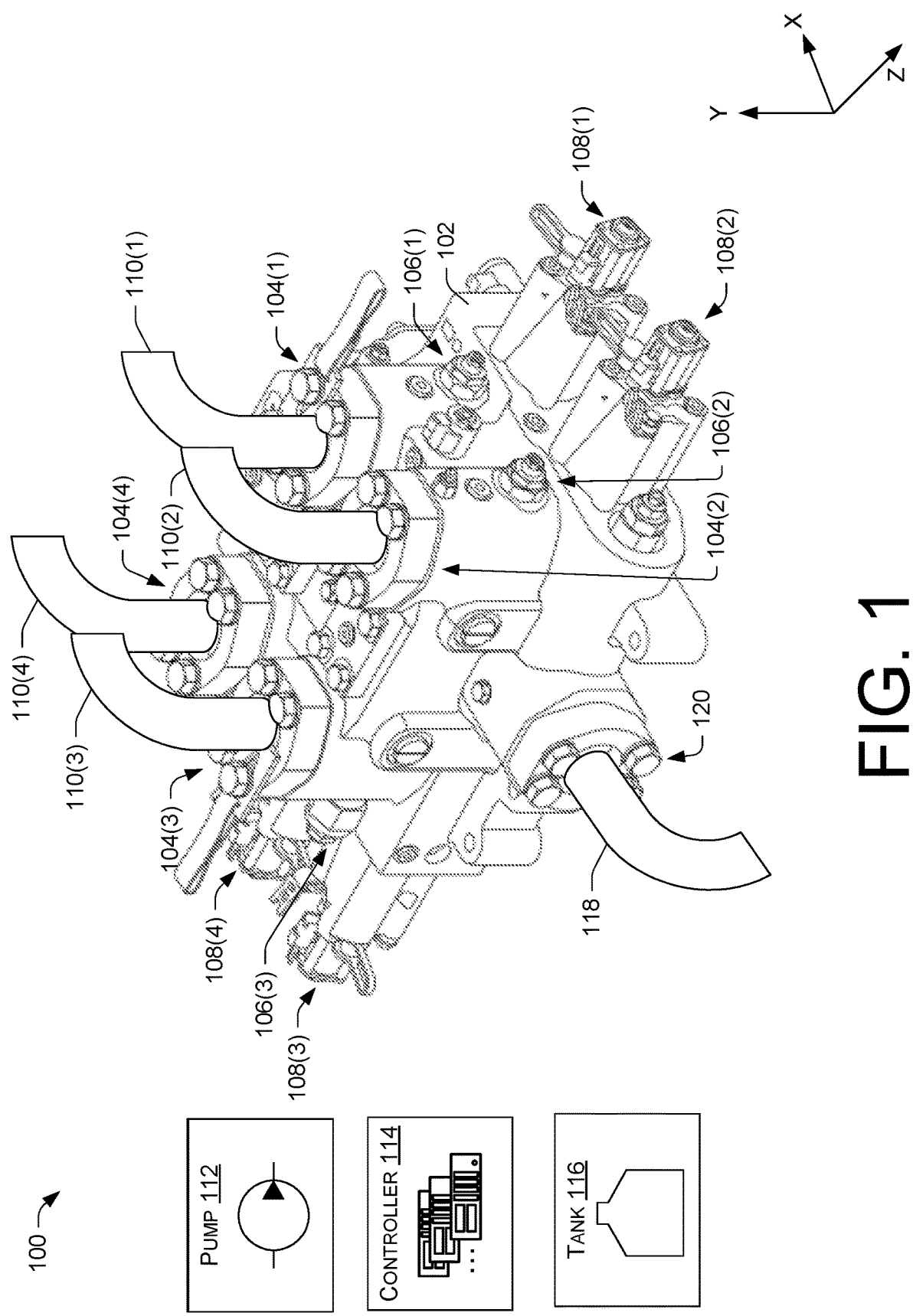
FIG. 1 illustrates an example hydraulic valve assembly that includes a valve body and one or more hydraulic attachment ports for providing pressurized hydraulic fluid.
Figure 2:
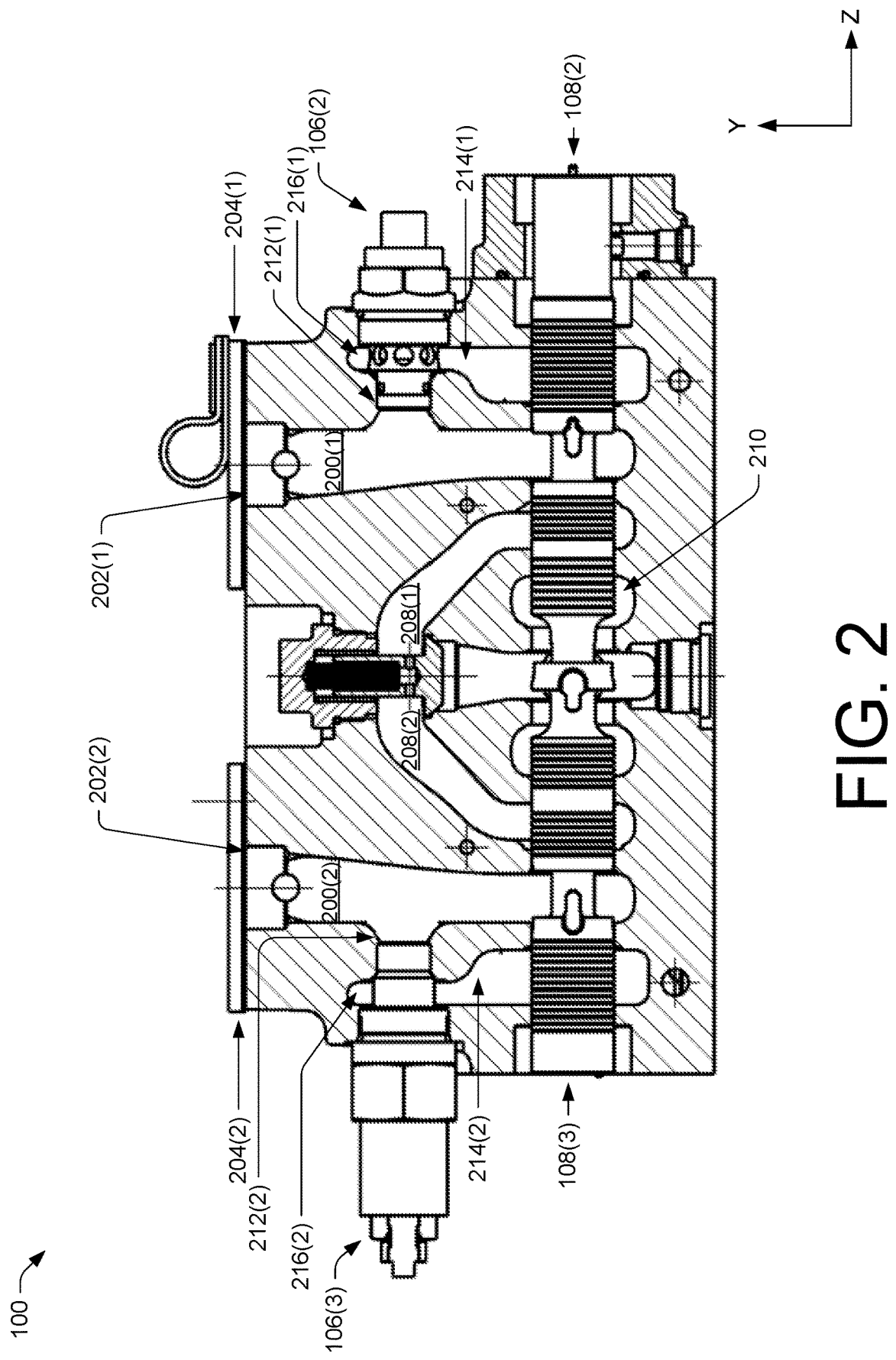

FIG. 2 illustrates a cross-sectional view of the hydraulic valve assembly of FIG. 1, showing the valve body defining passageways and channels.

Figure 3:
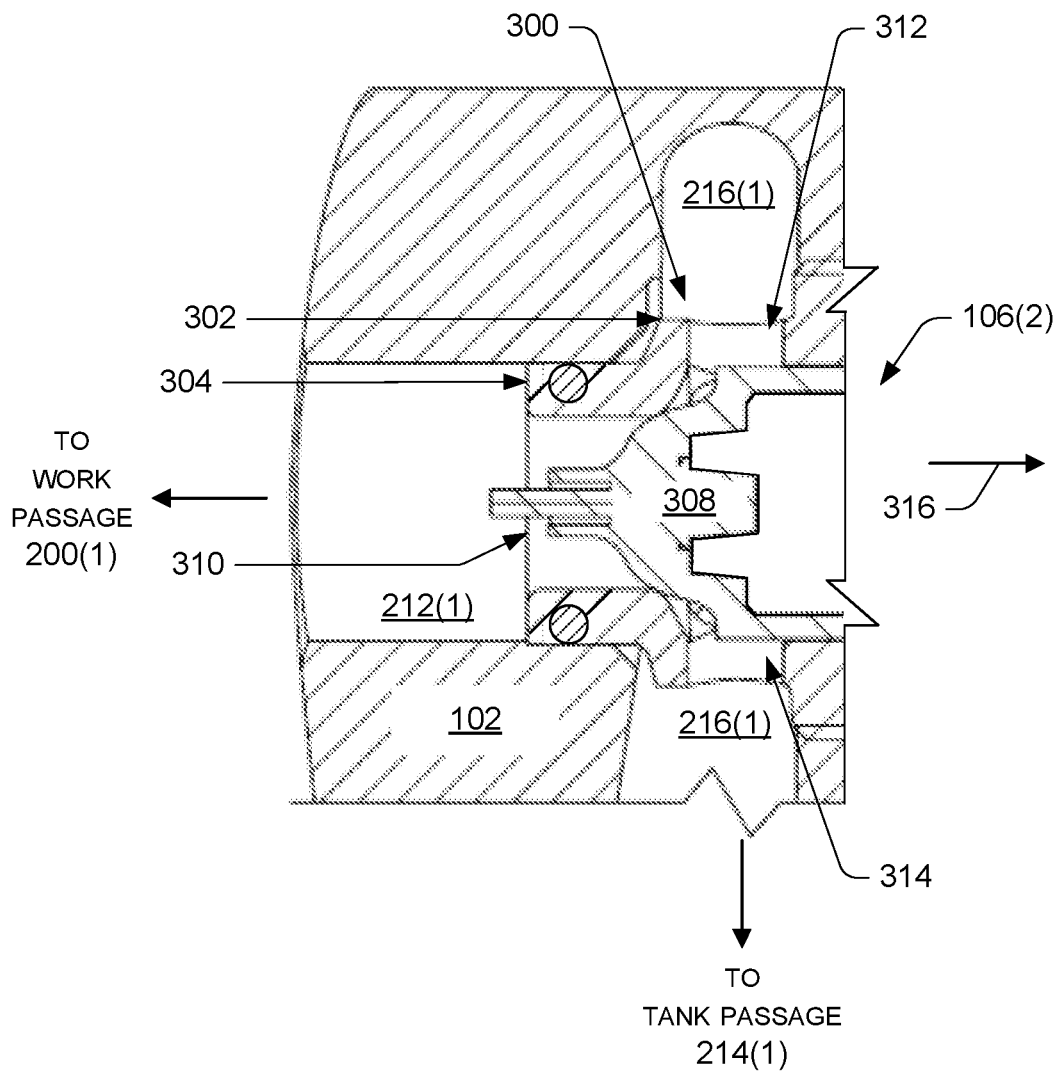

FIG. 3 illustrates a partial cross-sectional view of the hydraulic valve assembly of FIG. 1 showing a first example relief valve disposed within the valve body. In some examples, the relief valve may be disposed between a work port of the valve body and a tank port of the valve body.

Figure 4:
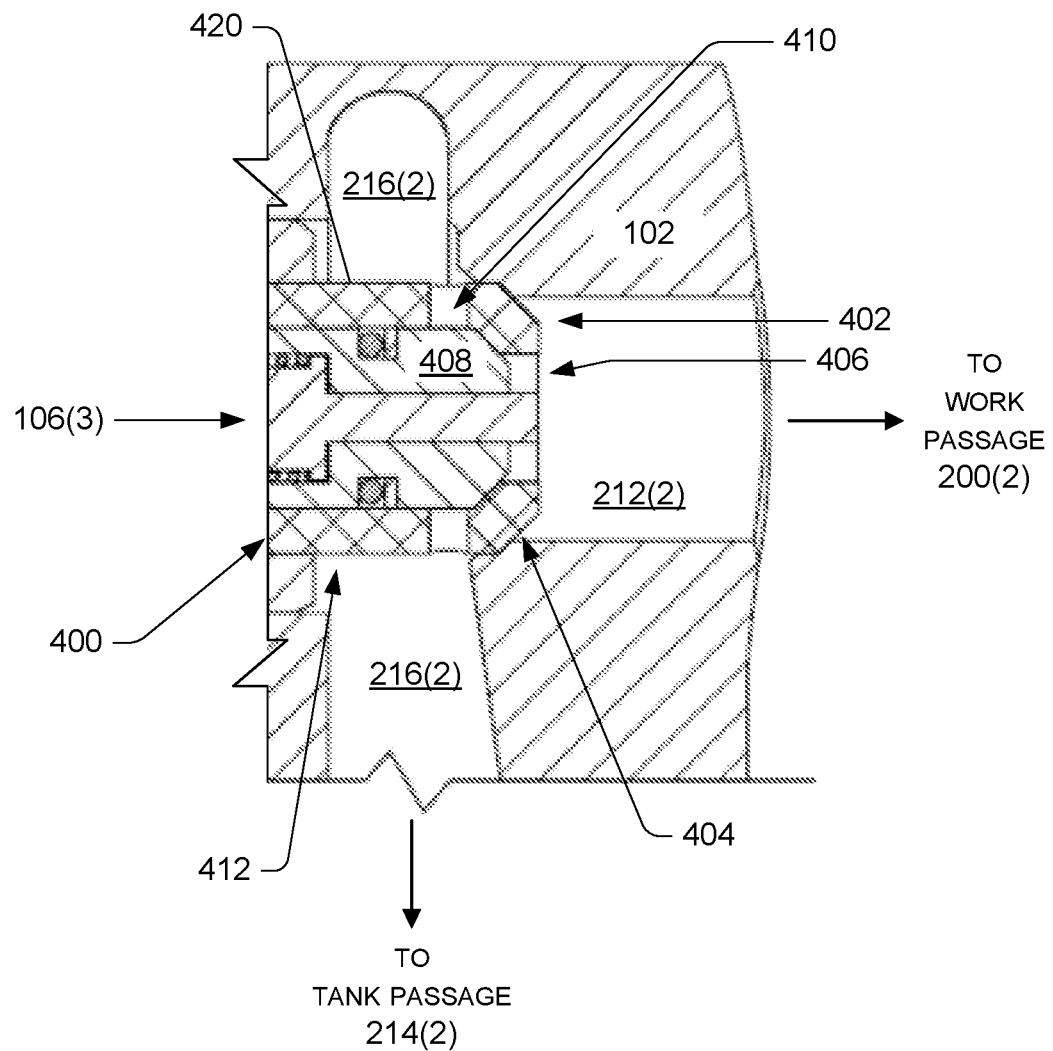

FIG. 4 illustrates a partial cross-sectional view of the hydraulic valve assembly showing a second example relief valve at least partially disposed within the valve body. In some examples, the relief valve may be disposed between a work passage of the valve body and a tank passage of the valve body.

Figure 5:
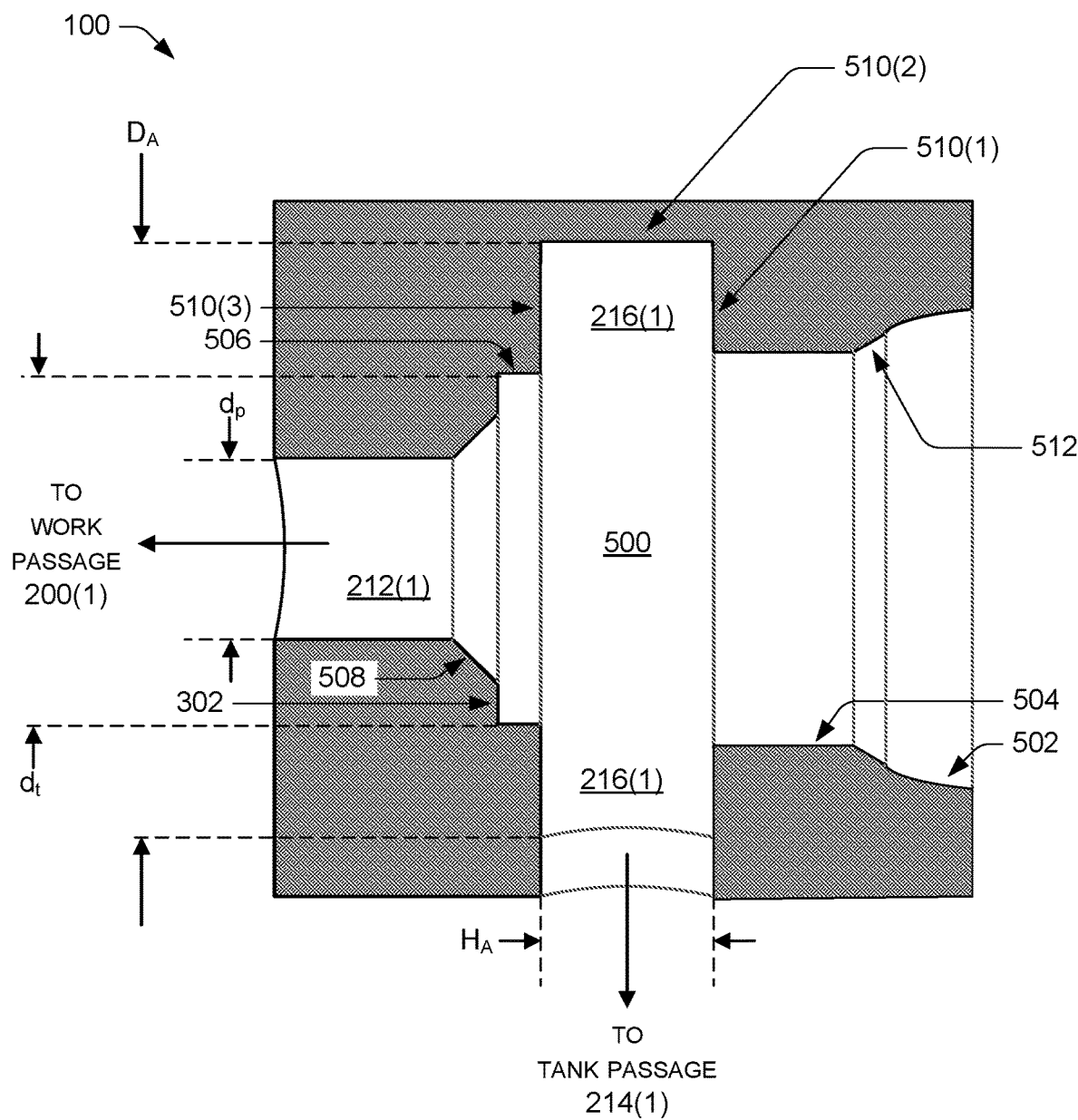

FIG. 5 illustrates a partial cross-sectional view of the valve body associated with the hydraulic valve assembly shown in FIG. 1. FIG. 5 illustrates an example cavity of the valve body within which the relief valve of FIG. 3 or the relief valve of FIG. 4 may reside.

Figure 6:
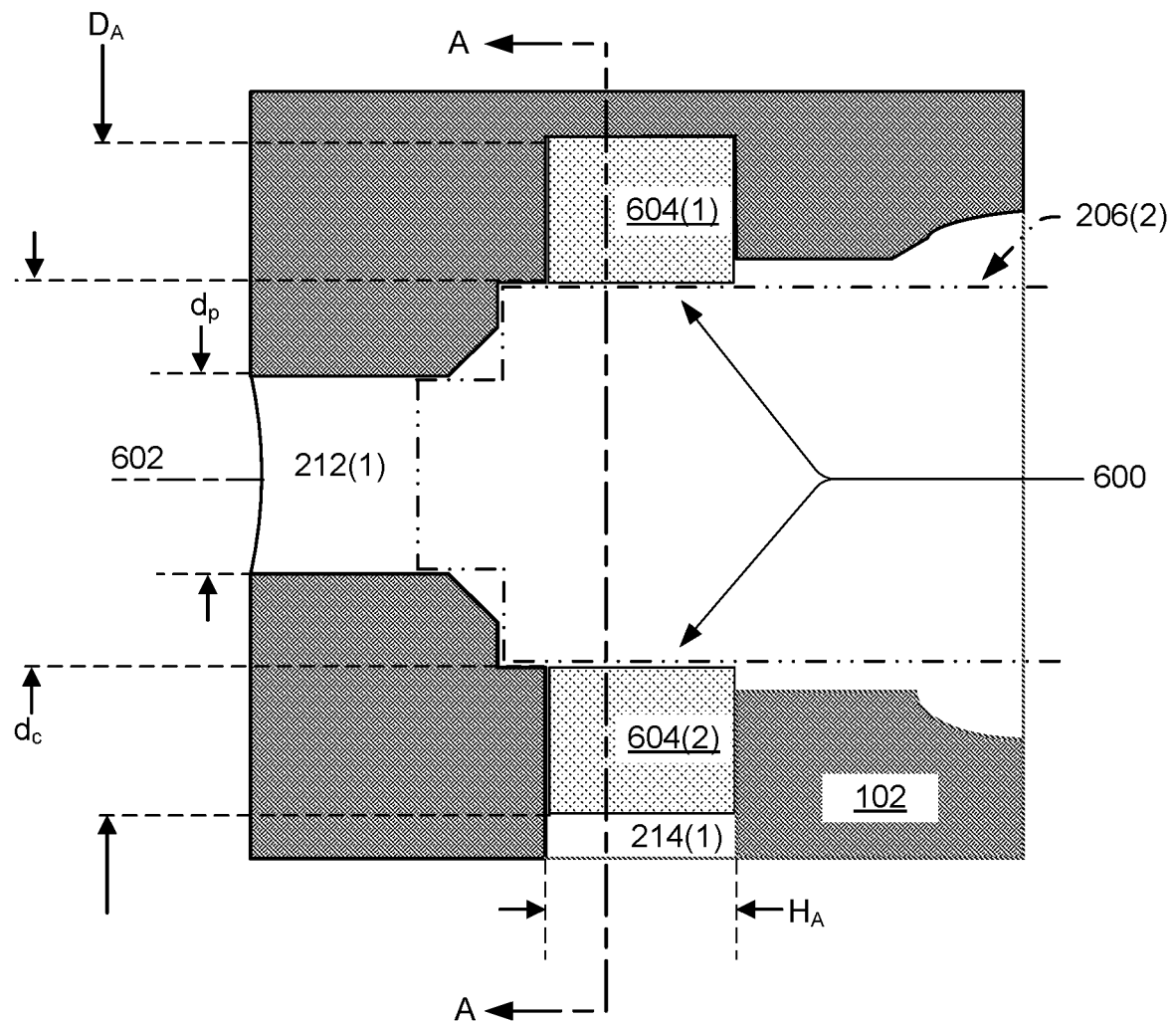

FIG. 6 illustrates a partial cross-sectional view of the valve body of FIG. 5. FIG. 6 illustrates a first cross-sectional area of an annulus of the cavity within which the relief valve of FIG. 3 or the relief valve of FIG. 4 may reside.

Figure 7:
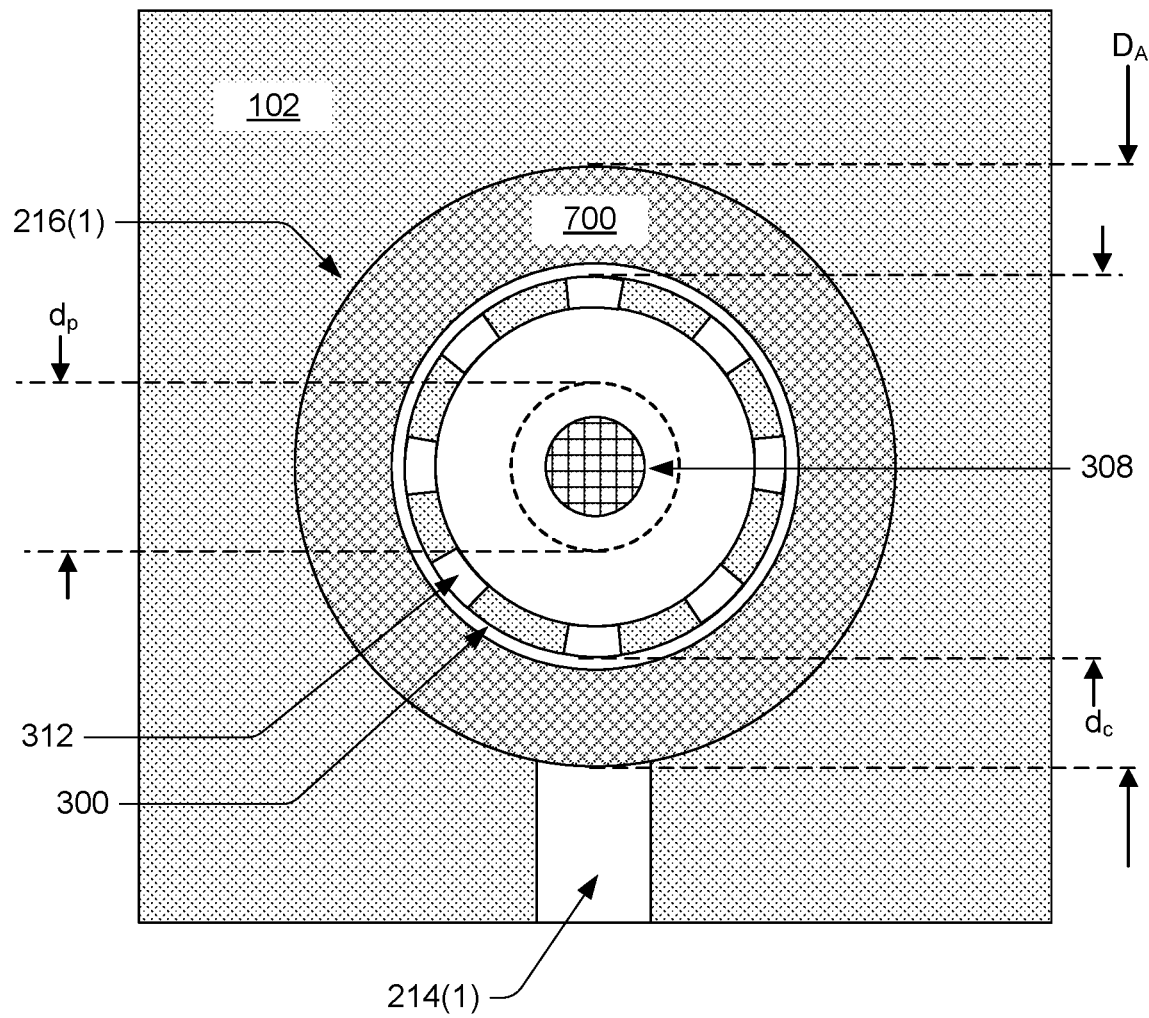

FIG. 7 illustrates a partial cross-sectional view of the valve body of FIG. 5. FIG. 7 illustrates a second cross-sectional area of an annulus of the cavity within which the relief valve of FIG. 3 or the relief valve of FIG. 4 may reside.

Figure 8:
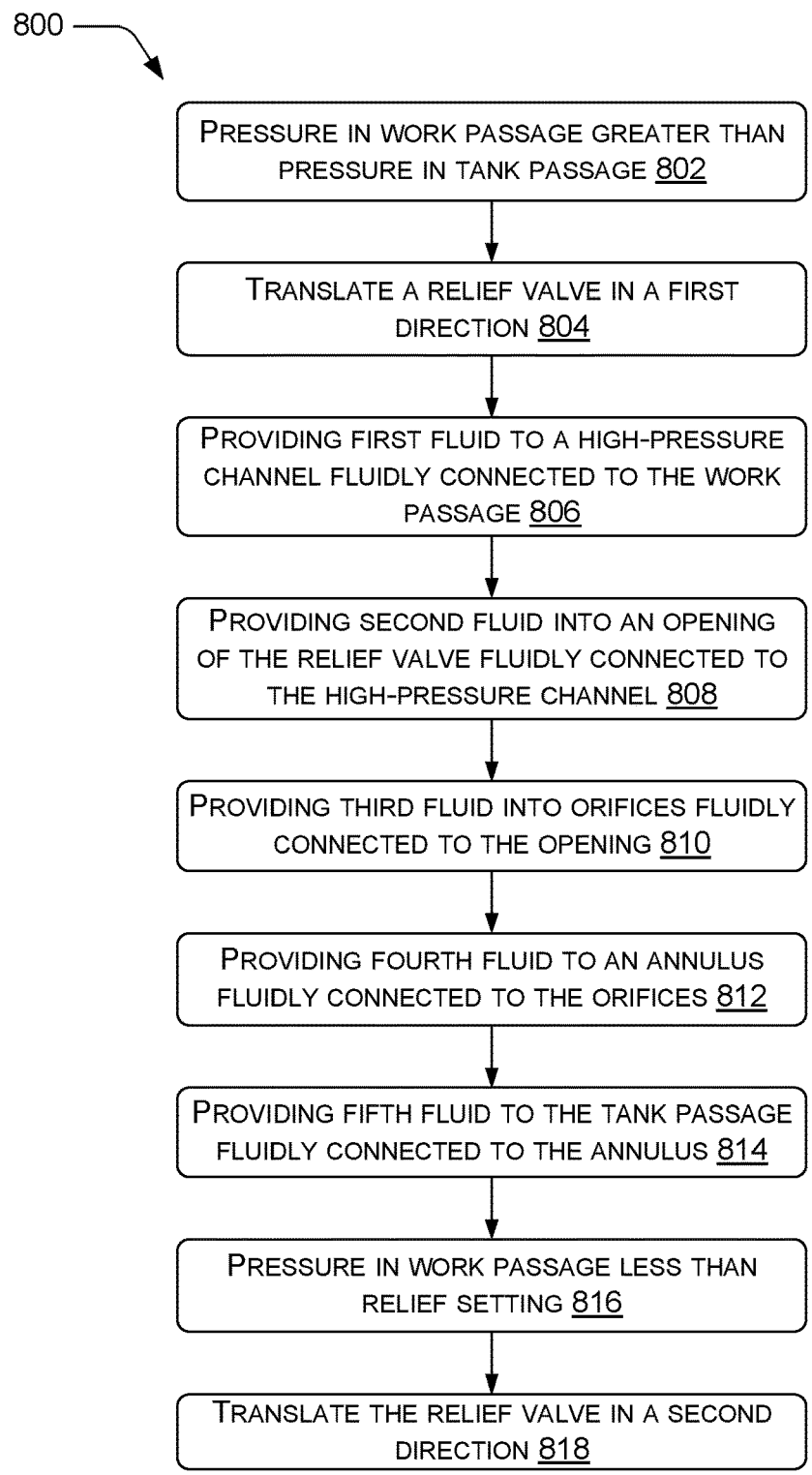

FIG. 8 illustrates an example process for providing fluid through a relief valve, between a work passage and a tank passage.

DETAILED DESCRIPTION

FIG. 1 is a perspective view of an example hydraulic valve assembly 100. Such an example hydraulic valve assembly may comprise a component of a machine and/or may be fluidly connected to various parts of a machine. In some examples, the machine may be any type of machine configured to travel across terrain, such as an automobile, an over the road truck, a construction machine, a paving machine, a mining machine, an agricultural vehicle, and/or work vehicles, such as a wheel loader, a track loader, a skid-steer loader, a mining shovel, a grader, a truck, and/or any other machine known to a person skilled in the art. In some examples, the machine may be a stationary machine. More generally, however, example machines employing the hydraulic valve assembly 100 are mobile machines, and in any of the examples described herein, the hydraulic valve assembly 100 may form a portion of a hydraulic system configured to assist the machine with carrying out or performing various work tasks (e.g., lifting, steering, braking, etc.). In some examples, the hydraulic valve assembly 100 may connect to or receive work implements for hydraulically powering implements (e.g., bucket, brushcutters, augers, grapples, hammers, etc.). More generally, however, the hydraulic valve assembly 100 may find use in any hydraulic application where hydraulic fluid is used to perform work.

The hydraulic valve assembly 100 may include a valve body 102, attachment ports 104(1)-(4), relief valves 106(1)-(3), and/or control valves 108(1)-(4). As discussed in detail herein, the attachment ports 104(1)-(4) may fluidly connect to hydraulic cylinders or other hydraulic components of one or more work implements of the machine. The attachment ports 104(1)-(4) may be configured to direct hydraulic fluid to such hydraulic components and/or to receive hydraulic fluid from such components. For example, as shown in FIG. 1, hydraulic lines 110(1)-(4) of such work implements (e.g., bucket(s), augers, grapples, etc.) may couple to the valve body 102 at the attachment ports 104(1)-(4) for receiving pressurized hydraulic fluid from the hydraulic valve assembly 100. At the attachment port(s) 104(1)-(4), the hydraulic valve assembly 100 may direct hydraulic fluid to the hydraulic lines 110(1)-(4), respectively. In some instances, multiple hydraulic lines of a single work implement may couple to the hydraulic valve assembly 100 or hydraulic lines from multiple work implements may couple to the hydraulic valve assembly 100. In some examples, the work implements or the hydraulic lines 110(1)-(4) of the work implements may couple to the hydraulic valve assembly 100 at the attachment ports 104(1)-(4) using various quick disconnects, couplers, and so forth. Alternatively, the work implements may couple to the hydraulic valve assembly 100 using fasteners, such as bolts. Although FIG. 1 illustrates the hydraulic valve assembly 100 including five attachment ports 104(1)-(4), the hydraulic valve assembly 100 may include more than or less than five attachment ports 104(1)-(4). Additionally, the five attachment ports 104(1)-(4) may be disposed at locations on the hydraulic valve assembly 100 other than those shown in FIG. 1. Moreover, not all of the attachment ports 104(1)-(4) may have an associated hydraulic line 110(1)-(4) attached thereto.

The pressurized hydraulic fluid directed from the hydraulic valve assembly 100 to the hydraulic components of the example work implements described herein may drive movement of the work implements in order to assist the work implements with performing a variety of tasks. For example, pressurized hydraulic fluid directed from the hydraulic valve assembly 100 to such hydraulic components may assist in raising or lowering a bucket, raising or lowering a boom or a stick to which the bucket is connected, rotating a cab assembly of the machine, moving a shovel of the machine relative to a machine frame, gripping on or more objects disposed at a worksite, etc. The hydraulic valve assembly 100 may also find use in other hydraulic applications, such as machine steering, machine propulsion, and machine braking.

As discussed herein, the valve body 102 includes or defines receptacles for receiving the relief valves 106(1)-(3). For example, the valve body 102 may define threaded receptacles into which the relief valves 106(1)-(3) are received. In some examples, the valve body 102 may receive different types of relief valves, such as spring-loaded relief valves, balanced spring-loaded relief valves, pilot-operated relief valves, and so forth. The relief valves 106(1)-(3) may also correspond to full or partial-style relief valves, as discussed in more detail herein. The relief valves 106(1)-(3) may also be operator-adjustable and/or electronically adjustable. For example, by changing a preload of internal springs within the relief valve(s) 106(1)-(3) (e.g., via adjusting screws, knobs, etc.) the relief valves 106(1)-(3) may be adjusted for providing different levels of makeup and/or relief flow.

Within the valve body 102, and as discussed herein, the relief valves 106(1)-(3) may be disposed between work passages and tank passages. For example, the valve body 102 may define work passages and tank passages. The relief valves 106(1)-(3) may be disposed between the work passage and the tank passage to provide relief and/or makeup flow. That is, the relief valves 106(1)-(3) may limit cavitation within the hydraulic valve assembly 100 (or work ports of the hydraulic valve assembly 100) by providing makeup flow of the hydraulic fluid. In some instances, this may occur when a pressure in a hydraulic fluid tank 116 exceeds a pressure in the work passage. The hydraulic fluid tank 116 fluidly connects to the work ports, or attachment point(s) 104(1)-(4) of the hydraulic fluid assembly 100. Alternatively, when the pressure in the work passage exceeds a predetermined threshold, such as during thermal expansion of the hydraulic fluid, the relief valves 106(1)-(3) permit hydraulic fluid to flow from the work passage to the tank 116. As such, the relief valves 106(1)-(3) are disposed in the valve body 102 to fluidly connect the work passages and the tank passages. In some examples, the hydraulic valve assembly 100 may include a number of relief valves 106(1)-(3) that is equal to the number of the attachment ports 104(1)-(4). In FIG. 1, not all of the relief valves are shown. For example, the attachment port 104(4) may include a corresponding relief valve. Alternatively, one or more of the attachment ports 104(1)-(4) may be capped, plugged, and/or otherwise temporarily fluidly sealed when not in use.

The hydraulic valve assembly 100 may include, or be communicatively coupled to, a controller 114. The controller 114 may control various operations, such as sending signals to the pump(s) 112, opening and closing the control valve(s) 108(1)-(4), pressurized hydraulic fluid within the hydraulic valve assembly 100, and so forth. For example, the controller 114 may send signals to the control valves 108(1)-(4) to control fluid flow within the hydraulic valve assembly 100 by varying the size of hydraulic fluid passages from the pump 112 to the attachment point(s) 104(1)-(4) and from the attachment point(s) 104(1)-(4) to the tank 116. In such instances, the controller 114 may cause the control valve 108(1)-(4) to open and close by varying degrees depending on the needs and/or requirements of the hydraulic lines 110(1)-(4) fluidly connected to the hydraulic valve assembly 100. The controller 114 may additionally or alternatively communicatively couple to other components of the hydraulic valve assembly 100, or other components of a machine, for regulating the speed of the motor(s), pump(s), and cylinder(s), for example.

In some instances, the pump 112 may fluidly connect to the hydraulic valve assembly 100 via a pump line 118. The pump line 118 may connect to the hydraulic valve assembly 100 at a pump attachment point 120 (or pump inlet).

FIG. 2 illustrates a cross-sectional view of the hydraulic valve assembly 100 taken along a Y-Z plane extending through the relief valve 106(2) and the relief valve 106(3). The view in FIG. 2 depicts various components coupled to or disposed within the valve body 102. For example, FIG. 2 illustrates the relief valves 106(2) and (3) coupled to the valve body 102. As shown, at least a portion of the relief valves 106(2) and (3) are disposed within the valve body 102.

The valve body 102 may define various ports, channels, and passageways for carrying out an operation of the hydraulic valve assembly 100. These passageways may fluidly connect components of the hydraulic valve assembly 100 with one another and/or other components of the machine described above with respect to FIG. 1. The passageways also permit the hydraulic fluid to flow throughout the valve body 102, between components of the hydraulic valve assembly 100. For example, the valve body 102 may define a plurality of work passages, such as a work passage 200(1) and a work passage 200(2).

The work passage 200(1) and the work passage 200(2) may route, channel, direct, or otherwise provide hydraulic fluid to work implements fluidly connected to the hydraulic valve assembly 100. For example, the work passage 200(1) and the work passage 200(2) may channel hydraulic fluid to hydraulic lines of the work implements at the attachment ports 104(2) and 104(3), respectively. The work passage 200(1) may include a terminal end 202(1) and the work passage 200(2) may a terminal end 202(2) that routes the hydraulic fluid to the work implements. For example, a hydraulic line may couple to the attachment ports 104(2) and an additional hydraulic line may couple to the attachment ports 104(3).

As shown in FIG. 2, the terminal end 202(1) of the work passage 200(1) and the terminal end 202(2) of the work passage 200(2) may be capped to maintain hydraulic pressure within the hydraulic valve assembly 100 and/or protect the work passage 200(1) and the work passage 200(2) from contamination while the hydraulic valve assembly 100 is in storage or transport. For example, a cover 204(1) may be disposed over the terminal end 202(1) and a cover 204(2) may be disposed over the terminal end 202(2). The cover 204(1) and 204(2) may also protect the work passage 200(1) and the work passage 200(2) from contamination before connecting to the hydraulic lines 110(2) and 110(3), respectively. The cover 204(1) and/or the cover 204(2) may be removed for coupling the hydraulic valve assembly 100 to hydraulic lines of the work implements. However, as noted above, the attachment ports 104(1)-(4) may include quick disconnect couplers for easily coupling and decoupling hydraulic lines. When installed in a hydraulic system, the cover 204(1) and/or the cover 204(2) may be replaced with hydraulic lines connected to the work passage 200(1) and the work passage 200(2). In some instances, the cover 204(1) and/or the cover 204(2) may be left in place if the work passage 200(1) and the work passage 200(2) are not in use.

The work passage 200(1) and the work passage 200(2) may fluidly connect to the pump 112 for providing hydraulic fluid to the work implements. In some examples, the pump 112 may be disposed external to the hydraulic valve assembly 100. The pump 112 may include a rotary pump, a gear pump, a screw pump, a positive displacement pump, a piston pump, or any other type of pump for providing pressurized hydraulic fluid. Additionally, the hydraulic valve assembly 100 may include additional pumps coupled to an engine or electric motor. The valve body 102 may also define a pump passage 208(1) and a pump passage 208(2) that fluidly connect to the work passage 200(1) and the work passage 200(2), respectively. The pump passage 208(1) and the pump passage 208(2) may fluidly connect to the pump line 118 via the pump attachment point 120 for receiving pressurized hydraulic fluid. The valve body 102 may also define a control valve channel 210 for receiving the control valve 108(2) and the control valve 108(3). As shown in FIG. 2, the control valve channel 210 may fluidly connect the pump passage 208(1) to the work passage 200(1). The control valve channel 210 may also fluidly connect the pump passage 208(2) to the work passage 200(2). Additionally, the valve body 102 may include additional channels and passages for the attachment ports (s) 104(1) and 104(4).

The work passage 200(1) and the work passage 200(2) may fluidly connect to the relief valve 106(2) and the relief valve 106(3), respectively. For example, beginning with the work passage 200(1) and the relief valve 106(2), the valve body 102 may define a high-pressure channel 212(1) that fluidly connects the work passage 200(1) to the relief valve

106(2). As discussed in detail herein, the relief valve 106(2) may be at least partly disposed within a cavity of the valve body 102. The high-pressure channel 212(1) may fluidly connect the cavity and the work passage 200(1). In some examples, the high-pressure channel 212(1) may include a cylindrical, or substantially cylindrical, shape.

Additionally, the valve body 102 may define a tank passage 214(1). As shown in FIG. 2, within the hydraulic valve assembly 100, the relief valve 106(2) may be at least partly disposed between the high-pressure channel 212(1) and the tank passage 214(1). As such, hydraulic fluid may flow through the relief valve 106(2), between the high-pressure channel 212(1) and the tank passage 214(1). For example, the relief valve 106(2) may provide hydraulic relief to the work passage 200(1) and route hydraulic fluid to the tank 116 (not shown). Conversely, the relief valve 106(2) may provide hydraulic makeup and route hydraulic fluid from the tank 116 into the work passage 200(1).

The relief valve 106(2) therefore provides makeup hydraulic flow to allow the hydraulic fluid to flow from the tank 116 and into the work passage 200(1) to limit or prevent cavitation or voiding at the work passage 200(1). That is, hydraulic fluid may flow from the tank 116, via the tank passage 214(1) and into the work passage 200(1) via the high-pressure channel 212(1). This makeup flow may occur when the pressure in the tank 116 exceeds the pressure in the work passage 200(1). Furthermore, the relief valve 106(2) may provide a relief flow when the pressure in the work passage 200(1) exceeds a predetermined level. This may prevent damage to the hydraulic valve assembly 100, hydraulic lines, the work implement, and/or other components of the machine. In these instances, hydraulic fluid may flow from the work passage 200(1) and into the tank 116.

The valve body 102 or the cavity within the valve body 102 may further define an annulus 216(1) that surrounds at least a portion of the relief valve 106(2). For example, once the relief valve 106(2) couples to the valve body 102, the annulus 216(1) may circumferentially extend around the relief valve 106(2). In some examples, the annulus 216(1) may surround at least a portion of an outer periphery of the relief valve 106(2) exposed to the tank passage 214(1). The annulus 216(1) fluidly connects the work passage 200(1) and the tank passage 214(1).

The annulus 216(1) may provide an area or volume for hydraulic fluid exiting or entering the relief valve 106(2). In other words, the hydraulic fluid may flow through from the high-pressure channel 212(1), into the relief valve 106(2), out of the relief valve 106(2), into the annulus 216(1), and then into the tank passage 214(1). The annulus 216(1) may therefore fluidly connect to the tank passage 214(1) for routing hydraulic fluid to and from the tank 116.

As discussed in detail herein, the shape, size (e.g., radius, diameter, circumference, length, etc.) volume, surface area, and/or other configurations of the annulus 216(1) may limit cavitation or voiding at the work passage 200(2) by providing increased hydraulic fluid flow and/or relief from high-pressures within the work passage 200(1) (e.g., thermal expansion of the hydraulic fluid). For example, in some examples, a surface area of the relief valve 106(2) and exposed to the tank passage 214(1) may exceed an area of the high-pressure channel 212(1) by at least a factor of four. Additionally, a cross-sectional area of the annulus 216(1) around the relief valve 106(2) exposed to the tank passage 214(1) may exceed twenty-five percent of a cross-sectional area of the high-pressure channel 212(1). Still, the cross-sectional area of the annulus 216(1) exposed to the relief valve 106(2) may exceed the cross-sectional area of the high-pressure channel 212(1).

Additionally, the valve body 102 may define a high-pressure channel 212(2) that fluidly connects the work passage 200(2) and the relief valve 106(3). The relief valve 106(3) may be disposed within a cavity of the valve body 102, and the high-pressure channel 212(2) may fluidly connect the cavity and the work passage 200(2). In some examples, the high-pressure channel 212(2) may include a cylindrical, or substantially cylindrical, shape.

The valve body 102 may also define a tank passage 214(2). As shown in FIG. 2, within the hydraulic valve assembly 100, the relief valve 106(3) may be disposed between the high-pressure channel 212(2) and the tank passage 214(2). As such, hydraulic fluid may flow through the relief valve 106(3), between the high-pressure channel 212(2) and the tank passage 214(2). For example, the relief valve 106(3) may provide hydraulic makeup to the work passage 200(2).

The valve body 102 may further define an annulus 216(2) that surrounds at least a portion of the relief valve 106(3). For example, once the relief valve 106(3) couples to the valve body 102 and is disposed within the valve body 102, the annulus 216(2) may circumferentially extend around the relief valve 106(3). The annulus 216(2) may surround at least a portion of an outer periphery of the relief valve 106(3) exposed to the tank passage 214(2). The annulus 216(2) provides an area or volume for hydraulic fluid exiting or entering the relief valve 106(3). The hydraulic fluid may flow through from the high-pressure channel 212(2), into the relief valve 106(3), out of the relief valve 106(3), into the annulus 216(2), and then into the tank passage 214(2). The annulus 216(1) may therefore fluidly connect to the tank passage 214(2) for routing hydraulic fluid to and from the tank 116. Similar to the annulus 216(1), the annulus 216(2) may have a specific size, dimension, volume, and/or area to limit cavitation or voiding at the work passage 200(2) and provide relief from high-pressures within the work passage 200(2) (e.g., thermal expansion of the hydraulic fluid). In some examples, a surface area of the relief valve 106(3) and exposed to the tank passage 214(2) may exceed an area of the high-pressure channel 212(2) by at least a factor of four. Additionally, a cross-sectional area of the annulus 216(2) around the relief valve 106(3) exposed to the tank passage 214(2) may exceed twenty-five percent of a cross-sectional area of the high-pressure channel 212(2). Still, the cross-sectional area of the annulus 216(2) exposed to the relief valve 106(3) may exceed the cross-sectional area of the high-pressure channel 212(2).

The valve body 102 may receive different types of relief valves, such as full cartridge designs and partial partridge designs. In some examples, the relief valve 106(2) may represent a full cartridge design and the relief valve 106(3) may represent a partial cartridge design. In full cartridge designs, a makeup poppet seats within a cage of the relief valve 106(2). The cage of the relief valve 106(2) is in contact with, and sealed against, the valve body 102. That is, the makeup poppet may not be in direct contact with the valve body 102. Comparatively, in partial cartridge designs, a makeup poppet may be in direct contact with the valve body 102. Additional details of the full cartridge design and the partial cartridge design are discussed herein. However, in some examples, the portions of the valve body 102 that receive the relief valve 106(2) and the relief valve 106(3) may be similar in shape, size, and geometry.

FIG. 3 illustrates a partial cross-sectional view of the valve body 102 taken along a Y-Z plane of FIG. 1 through the relief valve 106(2) and the relief vale 106(3). As shown, the relief valve 106(2) engages with the valve body 102. As discussed herein, the valve body 102 may define a cavity (shown in FIG. 5) within which the relief valve 106(2) is at least partly disposed. In FIG. 3, the relief valve 106(2) is shown residing within or coupled to the valve body 102.

The relief valve 106(2) may include a cage 300 received within the cavity of valve body 102. The cage 300 may contact, abut, or engage a flange 302 of the cavity. The relief valve 106(2) includes a distal end 304 that at least partially resides within the high-pressure channel 212(1) and a proximal end opposite the distal end 304. The proximal end may threadedly engage with the valve body 102. When the relief valve 106(2) couples to the valve body 102, the distal end 304 may reside at least partially within the high-pressure channel 212(1) and the cage 300 may reside adjacent to the annulus 216(1). The cage 300 may therefore be exposed to the tank passage 214(1) via the annulus 216(1). As shown in FIG. 3, the relief valve 106(2) may also include one or more O-rings for sealing the relief valve 106(2) within the valve body 102.

The relief valve 106(2) includes a poppet 308 that resides within the cage 300 to provide makeup and relief flow. To fluidly connect the high-pressure channel 212(1) and the tank passage 214(1), the distal end 304 of the relief valve 106(2) includes an opening 310. In FIG. 3, a tip of the poppet 308 is shown extending of out the distal end 304 of the relief valve 106(2). Additionally, the cage 300 is shown including orifices 312. The orifices 312 may circumferentially extend around a periphery, or external surface, of the cage 300. As shown, in some examples, the orifices may be circular, or substantially circular, in shape. With this configuration, the poppet 308 permits hydraulic fluid to flow between the high-pressure channel 212(1) and the tank passage 214(1). For example, the poppet 308 is in fluid connection with the work passage 200(1) via the high-pressure channel 212(1) and the opening 310 at the distal end 304. Additionally, the poppet 308 is in fluid connection with the tank passage 214(1) via the annulus 216(1) and the orifices 312.

In instances where the work passage 200(1) pressure exceeds that of the tank passage 214(1) (or the tank 116) the poppet 308 may longitudinally translate in a direction 306 (Z-direction) to permit hydraulic fluid to flow from the work passage 200(1) to the tank passage 214(1). Here, the poppet 308 may provide relief flow. That is, when the poppet 308 translates in the direction 306 and is disposed at a first position, hydraulic fluid is permitted to flow from the work passage 200(1) to the tank passage 214(1). Comparatively, at another position, such as that shown in FIG. 3, the poppet 308 may seat against the cage 300 as restrict hydraulic fluid flowing between the work passage 200(1) and the tank passage 214(1). Additionally, in instances where the tank passage 214(1) pressure exceeds that of the work passage 200(1) the poppet 308 may longitudinally translate to permit hydraulic fluid to flow from the tank passage 214(1) to the work passage 200(1). Here, the poppet 308 may provide makeup flow.

The annulus 216(1) circumferentially extends around the relief valve 106(2) (Z-axis). Stated alternatively, when the relief valve 106(2) is disposed within the valve body 102, the annulus 216(2) may surround, encircle, or enclose the cage 300. The annulus 216(1) exposes the relief valve 106(2) to the tank passage 214(1) to allow hydraulic fluid to flow into and out of the relief valve 106(2). For example, the hydraulic fluid may flow from the tank passage 214(1), to the annulus 216(1), through the orifices 312, into the relief valve 106(2), into the high-pressure channel 212(1), and then into the work passage 200(1). This flow may be in the opposite direction, whereby the hydraulic fluid flows from the work passage 200(1), to the high-pressure channel 212(1), through the relief valve 106(2), out the orifices 312, into the annulus 216(1), and then into the tank passage 214(1). A seal or engagement between the cage 300 and the flange 302, as well as one or more O-rings, may prevent hydraulic fluid leaking around the cage 300.

In some examples, the cage 300 may have a surface area 314 exposed to the annulus 216(1). This surface area 314 may circumferentially extend around an exterior of the cage 300, about the Z-axis.

In some examples, the surface area 314 of the cage 300 exposed to the annulus 216(1) (or the tank passage 214(1)) may be two times greater than or equal to the cross-sectional area of the high-pressure channel 212(1). For example, the relationship between the surface area 314 exposed to the annulus 216(1) (or the tank passage 214(1)) and the cross-sectional area of the high-pressure channel 212(1) may be represented by the following equation.

$$\pi d_c H_a \geq \frac{1}{2} \pi d_p^2 \qquad \text{Equation (1)}$$

where:
$d_c$ is the diameter of the cage 300 (in the X-direction);
$H_a$ is the height of the annulus 216(1) (in the Z-direction); and
$d_p$ is the diameter of the high-pressure channel 212(1) (in the X-direction).

In some instances, in Equation 1, $d_p$ may also be representative of a diameter of the cage 300.

FIG. 4 illustrates a partial cross-sectional view of the valve body 102 taken along a Y-Z plane of FIG. 1 through the relief valve 106(2) and the relief vale 106(3). As shown, the relief valve 106(3) engages with the valve body 102. As discussed herein, the valve body 102 may define a cavity within which the relief valve 106(3) is disposed. In FIG. 4, the relief valve 106(3) is shown residing within or coupled to the valve body 102.

The relief valve 106(3) may include a makeup poppet 400 received within the cavity of valve body 102. The makeup poppet 400 may include a distal end 402 and a proximal end threadedly engaged with the valve body 102. When coupled to the valve body 102, the distal end 402 may be exposed to the high-pressure channel 212(2). The makeup poppet 400 may include an opening 406 at the distal end 402 to expose a relief poppet 408 to the hydraulic fluid. As shown, the relief poppet 408 may reside within the makeup poppet 400. The makeup poppet 400 further includes orifices 410 to expose the relief poppet 408 to the tank passage 214(2). The orifices 410 may circumferentially extend around a periphery, or external surface, of the makeup poppet 400. The relief poppet 408 is in fluid connection with the work passage 200(2) via the high-pressure channel 212(2) and the opening 406 at the distal end 402. Additionally, the relief poppet 408 is in fluid connection with the tank passage 214(2) via the annulus 216(2) and the orifices 410.

The makeup poppet 400 may include a side 412 exposed to the tank passage 214(2) via the annulus 216(2). The makeup poppet 400 may also include a chamfered portion 404 between the side 412 and the distal end 402. At least a portion of the side 412 and/or at least a portion of the chamfered portion 404 may engage the valve body 102. For example, engagement the chamfered portion 404 and the valve body 102 may prevent hydraulic fluid leaking around the side 412, between the tank passage 214(2) and the high-pressure channel 212(2).

The chamfered portion 404 may provide a valve seat for seating or positioning the relief valve 106(3) within the valve body 102. The valve seat may be a component of the makeup poppet 400 as compared to being machined in a cage (e.g., the cage 300 of the relief valve 106(2)). In instances where the makeup poppet 400 directly seals against the valve body 102, leaks may occur. The engagement (or seat) between the valve body 102 and the chamfered portion 404 of the makeup poppet 400 may be complimentary. For example, minor tolerances and/or wear may degrade a seal formed between the valve body 102 and the chamfered portion 404. The relief valve 106(3), and/or a body of the relief valve 106(3), may further include one or more O-rings for sealing within the valve body 102. Additionally, although FIG. 4 illustrates a particular engagement between the valve body 102 and the makeup poppet 400, the makeup poppet 400 may seal to the valve body 102 along other planes and/or surfaces.

During operation, the pressure of the hydraulic fluid at the work passage 200(2) (or the high-pressure channel 212(2)) can be higher than pressure in the tank 116. Here, the hydraulic fluid pressure from the work passage 200(2) is fluidly communicated to an inner surface of the makeup poppet 400. This fluid pressure against the inner surface of the makeup poppet 400 firmly presses the makeup poppet 400 against the valve seat (e.g., the interaction with the chamfered portion 404 and the valve body 102). When the pump 112 cannot supply a proper amount of hydraulic fluid, and/or where cavitation may occur, and a makeup flow is needed a pressure at the relief valve 106(3) inlet drops below pressure in the tank 116. In such instances, the force acting on the outer surface of the makeup poppet 400 may overcome the force due to reduced work pressure acting on the inner surface of the makeup poppet 400. The makeup poppet 400 then longitudinally translates backwards (e.g., away from the high-pressure channel 212(1)), and hydraulic fluid flows around the makeup poppet and into the work passage 200(2).

The annulus 216(2) circumferentially extends around the relief valve 106(3) (Z-axis). Stated alternatively, when the relief valve 106(3) is disposed within the valve body 102, the annulus 216(2) may surround, encircle, or enclose the makeup poppet 400. The annulus 216(2) exposes the relief valve 106(3) to the tank passage 214(2) to allow hydraulic fluid to flow into and out of the relief valve 106(3). For example, the hydraulic fluid may flow from the tank passage 214(2), to the annulus 216(2), through the orifices 410, into the relief valve 106(3), into the high-pressure channel 212(2), and then into the work passage 200(2). This flow may be in the opposite direction, whereby the hydraulic fluid flows from the work passage 200(2), to the high-pressure channel 212(2), through the relief valve 106(3), out the orifices 410, into the annulus 216(2), and then into the tank passage 214(2).

In some examples, and as introduced above, the valve body 102 may define specific dimensions, sizes, and/or areas of the high-pressure channel 212(2), the tank passage 214(2), and/or the annulus 216(2) for optimizing makeup flow. Additionally, or alternatively, the specific dimensions, sizes, and/or areas of the high-pressure channel 212(2), the tank passage 214(2), and/or the annulus 216(2) may be relative to dimensions, sizes, and/or areas of the relief valve 106(3) for optimizing makeup flow.

For example, the makeup poppet 400 have a surface area 420 at the side 412 exposed to the annulus 216(2). Noted above, this surface area 420 may circumferentially extend around an exterior of the makeup poppet 400, about the Z-axis. In some examples, the surface area 420 of the makeup poppet 400 exposed to the annulus 216(2) (or the tank passage 214(2)) may be at least two times greater than or equal to the cross-sectional area of the high-pressure channel 212(2). For example, the relationship between the surface area 420 exposed to the annulus 216(2) (or the tank passage 214(2)) and the cross-sectional area of the high-pressure channel 212(2) may be represented by the following equation.

$$\pi d_m H_a \geq \frac{1}{2} * \pi d_p^2 \qquad \text{Equation (2)}$$

where:
$d_m$ is the diameter of the makeup poppet 400 (in the X-direction);
$H_a$ is the height of the annulus 216(2) (in the Z-direction); and
$d_p$ is the diameter of the high-pressure channel 212(2) (in the X-direction).

FIG. 5 illustrates a partial cross-sectional view of the valve body 102 taken along a Y-Z plane of FIG. 1 extending through the relief valve 106(2) and the relief vale 106(3). In some examples, FIG. 5 may represent a portion of the valve body 102 receiving the relief valve 106(2) or the relief valve 106(3), as discussed above with regard to FIGS. 3 and 4, respectively. For purposes of explanation, FIG. 5 is discussed in regard to the portion of the valve body 102 receiving the relief valve 106(2). However, it is to be understood that the components of the valve body 102 illustrated and described in FIG. 5 may be applicable to the components of the valve body 102 which receive the relief valve 106(3).

In FIG. 5, the relief valve 106(2) is removed from the valve body 102 to illustrate additional features of the valve body 102 and the engagement of the relief valve 106(2). The valve body 102 defines a cavity 500 for receiving at least a portion of the relief valve 106(2). As discussed and introduced above, the cavity 500 may fluidly connect the high-pressure channel 212(1) and the tank passage 214(1). In this sense, the cavity 500 may represent a two-way cavity in which hydraulic fluid may flow between the work passage 20(1) and the tank passage 214(1). The high-pressure channel 212(1) may have a diameter $d_p$ and the annulus 216(1) may have a height $H_A$. In some examples the diameter $d_p$ of the high-pressure channel 212(1) may be approximately or substantially between 28 mm and 40 mm. In some examples, the height $H_A$ of the annulus 216(1) may be approximately or substantially between 13 mm and 18 mm. As shown, and in some examples, the height $H_A$ of the annulus 216(1) may be equal to, or substantially equal to, a diameter of the tank passage 214(1). In some instances, the tank passage 214(1) may be rectangular or any other shape. In such instances, the tank passage 214(1) may include a width, height, or cross-sectional dimension (as compared to a diameter).

FIG. 5 illustrates that the valve body 102 defines a first portion 502 for receiving the proximal end of the relief valve 106(2). In some examples, at least a portion of the relief valve 106(2) may reside (e.g., countersunk) into the first portion 502 for reducing a profile of the hydraulic valve assembly 100. The valve body 102 further defines a second portion 504 of the cavity 500 into which the relief valve 106(2) may thread. Additionally, the valve body 102 may define a tapered portion 512 on which a seal or O-ring of the relief valve 106(2) engages.

The valve body 102 also defines a third portion 506. In some examples, the third portion 506 may include a diameter $d_t$. The diameter $d_t$ may be equal to, or substantially equal to, the diameter $d_c$ of the cage 300. In some examples, the diameter $d_t$ of the third portion 506 may be approximately or substantially between 30 mm and 40 mm. When the relief valve 106(2) couples to the valve body 102, the cage 300 may reside at least partially within or surrounded by the annulus 216(1). In some examples, the engagement between the cage 300 and the second portion 504 may seat, position, or orient the relief valve 106(2) in the valve body 102. The flange 302 further engages the cage 300 when the relief valve 106(2) couples to the valve body 102.

The valve body 102 may further define a tapered portion 508. As shown, the tapered portion 508 may taper from the third portion 506 inwards towards the high-pressure channel 212(1). In some examples, a slope or taper (e.g., angel) of the tapered portion 508 may be configured to compliment, or be complimentary with, a taper of the chamfered portion 404 of the makeup poppet 400 of the relief valve 106(3). However, the valve body 102 may not include the tapered portion 508 in examples where the relief valve 106(3) is not used.

Introduced above, the valve body 102 or the cavity 500 defines the annulus 216(1). In some examples, the annulus 216(1) may represent a ring or donut shaped body that surrounds the relief valve 106(2). When the relief valve 106(2) couples to the valve body 102, the annulus 216(1) may circumferentially extend around relief valve 106(2). In doing so, the annulus 216(1) may provide a volume within which the hydraulic fluid flows through, between the high-pressure channel 212(1) and the tank passage 214(1).

As shown in FIG. 5, the annulus 216(1) may be defined at least in part by surfaces 510(1)-(3). The surfaces 510(1)-(3) may represent peripheral sidewalls or surfaces of the annulus 216(1) that extend around a circumference of the annulus 216(1). In some examples, the surface 510(1) may represent a top surface defining the annulus 216(1), the surface 510(2) may represent an outer peripheral surface defining the annulus 216(1), and the surface 510(3) may represent a bottom surface defining the annulus 216(1). In some examples, the distance from the surface 510(1) to the surface 510(3) may represent the height $H_A$ of the annulus 216(1). In addition to the annulus 216(1) being defined by the height $H_A$, the annulus 216(1) may include the diameter $D_A$. The diameter $D_A$ may be represented by taking diametrically opposed points along the peripheral surface of the annulus 216(1), such as the second surface 510(2). In some examples, the diameter $D_A$ of the annulus 216(1) may be approximately or substantially between 40 mm and 52 mm.

FIG. 6 illustrates a partial cross-sectional view of the valve body 102, taken along a Y-Z plane of FIG. 1 extending through the relief valve 106(2) and the relief vale 106(3). In FIG. 6, the relief valve 106(2) is shown in dashed lines to illustrate its position within the valve body 102.

The annulus 216(1) may include a first cross-sectional area 600 exposed to the tank passage 214(1). In some examples, the first cross-sectional area 600 may be taken about a longitudinal axis 602. The first cross-sectional area 600 of the annulus 216(1) may represent a vertical cross-sectional area. As illustrated in FIG. 6, the first cross-sectional area 600 may comprise a first area 604(1) and a second area 604(2). The first area 604(1) and the second area 604(2) may represent diametrically opposed areas around the annulus 216(1). That is, being as the annulus 216(1) circumferentially extends around the cavity 500, in a ring-like fashion, the first cross-sectional area 600 may be include the first area 604(1) and the second area 604(2). The first area 604(1) may be on a first side of the annulus 216(1) and the second area 604(2) may be on a second side of the annulus 216(1). The first side and the second side are diametrically opposed from one another around the annulus 216(1).

In some examples, the first cross-sectional area 600 of the annulus 216(1) may exceed twenty-five percent of the cross-sectional area of the high-pressure channel 212(1). In some examples, having the first cross-sectional area 600 of the annulus 216(1) exceed twenty-five percent of the cross-sectional area of the high-pressure channel 212(1) may ensure that, in the event of a make-up flow, hydraulic fluid is distributed evenly around circumference of the cage 300 before entering the orifices 312. This relationship may be represented by the following equation.

$$(D_A - d_c) * H_A \geq \frac{\pi}{16} * d_p^2 \qquad \text{Equation (3)}$$

where:
$D_A$ is the diameter of the annulus 216;
$d_c$ is the diameter of the cage 300;
$H_A$ is the height of the annulus; and
$d_p$ is the diameter of the high-pressure channel 212(1).

In some examples, the high-pressure channel 212(1) may be oriented orthogonally to the tank passage 214(1). Additionally, or alternatively, the annulus 216(1) may be concentrically aligned with the high-pressure channel 212(1) and/or the longitudinal axis 602.

FIG. 7 illustrates a partial cross-sectional view of the valve body 102, taken along line A-A of FIG. 6. In FIG. 7, the relief valve 106(2) is shown residing within the cavity 500. The orifices 312 are shown extending through the cage 300 for fluidly connecting the high-pressure channel 212(1) to the annulus 216(1).

The annulus 216(1) may include a second cross-sectional area 700 exposed to the tank passage 214(1). The second cross-sectional area 700 of the annulus 216(1) may represent a horizontal cross-sectional area. For example, as shown in FIG. 7, the second cross-sectional area 700 may represent a ring-like shape that surrounds the cage 300.

The cavity 500 is designed with geometrical dimensions for providing even distribution of makeup flow from the tank passage 214(1) to the high-pressure channel 212(1). For example, the second cross-sectional area 700 of the annulus 216(1) may be at least two times greater than or equal to the cross-sectional of the high-pressure channel 212(1). Having the second cross-sectional area 700 of the annulus 216(1) being the same, or greater than, the high-pressure channel 212(1) may prevent additional losses in the event of make-up flow. Thus, the amount of hydraulic fluid flow required to prevent voiding or cavitation may not be reduced. The relationship between the annulus 216(1) and the cross-sectional area of the high-pressure channel 212(1) may be represented by the following equation.

$$\frac{\pi}{4}((D_a)^2 - (d_c)^2) \geq \frac{\pi}{4} * d_p^2 \qquad \text{Equation (4)}$$

where:

$D_A$ is the diameter of the annulus 216(1);

$d_c$ is the diameter of the cage 300; and $d_p$ is the diameter of the high-pressure channel 212(1).

As noted above, the valve body 102 and the cavity 500 may receive the relief valve 106(3). In some examples, the chamfered portion 404 of the relief valve 106(3) may engage with the tapered portion 508 of the cavity 500. In these instances, the makeup poppet 400 may seat against tapered portion 508. Additionally, the side 412 of the relief valve 106(3) may reside within the second portion 504 of the cavity 500. In examples where the cavity 500 is configured for the relief vale 106(3), or partial cartridges, one or more dimensions of the cavity 500 may increase. For example, the diameter of the cavity 500 and/or the depth of the cavity 500 may increase. The increase is size may account for the smaller makeup poppet size between the relief valve 106(1) and the relief valve 106(2). That is, because the makeup poppet 400 of the relief valve 106(1) is constrained by the size of the cage 300, a cavity designed for the relief valve 106(2) be in larger in size (e.g., diameter and depth), as compared to a cavity designed for the relief valve 106(3).

FIG. 8 illustrates an example process 800 for controlling hydraulic fluid through a relief valve, such as the relief valve 106(2) or the relief valve 106(3).

At 802, the pressure in the work passage 200(1) may be greater than the pressure in the tank passage 214(1). In such instances, the relief valve 106(2) may provide relief flow and route hydraulic fluid from the work passage 200(1) to the tank passage 214(1), and ultimately into the tank 116. At 804, the relief valve 106(2) may translate in a first direction. For example, the relief valve 106(2) may longitudinally translate away from the work passage 200(1) due to the fluid pressure acting on a surface (e.g., poppet) of the relief valve 106. Translation of the relief valve 106(2) may allow hydraulic fluid to flow from the work passage 200(1) to the tank passage 214(1).

At 806, first fluid may be provided to a high-pressure channel 212(1) fluidly connected to the work passage 200(1). For example, first fluid may flow from the work passage 200(1) and into the high-pressure channel 212(1). At 808, second fluid may be provided into an opening 310 of the relief valve 106(2) fluidly connected to the high-pressure channel 212(1). For example, as a result of the relief valve 106(2) translating, hydraulic fluid may enter the relief valve 106(2) via the opening 310. At 810, third fluid may be provided into orifices 312 fluidly connected to the opening 310. For example, the orifices 312 and the opening 310 may be fluidly connected within the cage 300. As such, when hydraulic fluid enters the opening 310 the hydraulic fluid may be channeled to the orifices 312

At 812, fourth fluid may be provided to an annulus 216(1) fluidly connected to the orifices 312. For example, after the hydraulic fluidly passes out the orifices 312, the hydraulic fluid may enter the annulus 216(1) that surrounds at least a portion of the relief valve 106(2). In other words, hydraulic fluid may flow from the orifices 312 and into the annulus 216(1).

At 814, fifth fluid may be provided to the tank passage 214(1) fluidly connected to the annulus 216(1). That is, being as the annulus 216(1) fluidly connected to the tank passage 214(1), once the hydraulic fluid enters the annulus 216(1), the hydraulic fluid may be channeled to the tank passage 214(1).

At 816, the pressure in the work passage 200(1) may be less than a relief setting. The process 800 illustrates a scenario whereby the relief valve 106(2) translates to provide relief to the hydraulic fluid (e.g., thermal expansion). As such, once relief is provided, the pressure in the work passage 200(1) may be less than a relief setting of the relief valve 106(2). As a result, at 818, the relief valve 106(2) may translate in a second direction. Once the relief valve 106(2) translates in the second direction, this may prohibit hydraulic fluid flowing from the work passage 200(1) to the tank passage 21(1). In other words, once the relief valve 106(2) provides relief, the relief valve 106(2) may close. As such, in case of relief event (i.e., when the relief valve 106(2) is open to connect work passage 200(1) to tank passage 214(1)), the work port pressure may be limited by relief setting. In case of make-up event, the tank pressure may exceed work passage 200(1) pressure (which may drop due to over running loads)

INDUSTRIAL APPLICABILITY

The example systems and methods of the present disclosure are applicable to a variety of hydraulic systems or machine that include hydraulic systems. For example, machines may include hydraulic systems for powering work implements (e.g., buckets, plows, etc.) and/or for braking, steering, and so forth. In some examples, the hydraulic systems may have a valve assembly that includes a valve body. The valve body may house relief valves that provide make and relief flow. The relief valves may be disposed between a work passage and a tank passage within a cavity formed by the valve body. The work passage may fluidly connect to hydraulic lines for powering work implements, for example, while the tank passage may fluidly connect to a hydraulic fluid tank. The relief valve may reside within the cavity of the valve body, between the work passage and the tank passage. Moreover, the valve body may define an annulus that surrounds at least a portion of the relief valve and which is fluidly connects to the relief valve and the tank passage. As such, hydraulic fluid may flow from the work passage, through the annulus, and into the tank passage, vice versa. The valve body may further define a high-pressure channel fluidly connecting the work passage and the cavity.

The relief valve and the valve body provide sufficient relief and/or makeup flow for hydraulic fluid within the hydraulic valve assembly. For example, during thermal expansion of the hydraulic fluid, the relief valve provides relief to allow the hydraulic fluid to flow from the work passage to the tank passage. Additionally, the relief valve may provide makeup flow to allow the hydraulic fluid to flow from the tank passage to the work passage for limiting cavitation at attachment points of the hydraulic valve assembly. The cavity may include dimensional characteristics that provide an even distribution of incoming makeup flow from the tank passage. For example, a surface area of the relief valve exposed to the tank passage may exceed an area of the high-pressure channel by at least a factor of four. Additionally, a cross-sectional area of the annulus around the relief valve exposed to the tank passage may exceed twenty-five percent of a cross-sectional area of the high-pressure channel. Still, in some examples, a second cross-sectional area of the annulus exposed to the relief valve may exceed the cross-sectional area of the high-pressure channel.

These dimensional relationships may provide sufficient relief and/or makeup flow for hydraulic fluid within the hydraulic valve assembly and/or reduce a footprint of hydraulic valve assemblies.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A hydraulic valve assembly, comprising:
a valve body defining:
   a first work passage configured to fluidly connect to a pump, the first work passage including a first attachment port configured to fluidly connect to a first hydraulic line;
   a second work passage configured to fluidly connect to the pump, the second work passage including a second attachment port configured to fluidly connect to a second hydraulic line;
   a first tank passage and a second tank passage, wherein the first tank passage and the second tank passage are configured to fluidly connect to a fluid tank;
   a first cavity having a first annulus fluidly connected to the first tank passage;
   a second cavity having a second annulus fluidly connected to the second tank passage;
   a first high-pressure channel fluidly connected to the first work passage and the first cavity; and
   a second high-pressure channel fluidly connected to the second work passage and the second cavity;
a first relief valve having a first distal end at least partly disposed in the first high-pressure channel and a first proximal end disposed external to the valve body, the first relief valve including a first surface area exposed to the first annulus of the first cavity, wherein the first surface area of the first relief valve is at least two times greater than a first cross-sectional area of the first high-pressure channel; and
a second relief valve having a second distal end at least partly disposed in the second high-pressure channel and a second proximal end disposed external to the valve body, the second relief valve including a second surface area exposed to the second annulus, wherein the second surface area of the second relief valve is at least two times greater than a second cross-sectional area of the second high-pressure channel.

2. The hydraulic valve assembly of claim 1, wherein:
the first cavity further includes:
   a first flange within which a cage or a poppet of the first relief valve is configured to engage; or
   a first tapered portion upon which the cage or the poppet of the first relief valve is configured to engage; and
the second cavity further includes:
   a second flange within which a cage or a poppet of the second relief valve is configured to engage; or
   a second tapered portion upon which the cage or the poppet of the second relief valve is configured to engage.

3. The hydraulic valve assembly of claim 1, wherein:
the first annulus includes a third cross-sectional area defined at least in part by a first area and a second area, wherein the first area and the second area are diametrically opposed areas around the first annulus on opposing sides of the first relief valve;
the third cross-sectional area is greater than at least twenty-five percent of the first cross-sectional area of the first high-pressure channel;
the second annulus includes a fourth cross-sectional area defined at least in part by a third area and a fourth area, wherein the third area and the fourth area are diametrically opposed areas around the second annulus on opposing sides of the second relief valve; and
the fourth cross-sectional area is greater than at least twenty-five percent of the second cross-sectional area of the second high-pressure channel.

4. The hydraulic valve assembly of claim 1, wherein at least one of:
the first annulus includes a third cross-sectional area that circumferentially extends around the first relief valve, the third cross-sectional area being greater than the first cross-sectional area of the first high-pressure channel; and
the second annulus includes a fourth cross-sectional area that circumferentially extends around the second relief valve, the fourth cross-sectional area being greater than the second cross-sectional area of the first high-pressure channel.

5. The hydraulic valve assembly of claim 1, wherein:
the first relief valve includes one or more first orifices circumferentially extending around a periphery of at least a portion of the first relief valve; and
the second relief valve includes one or more second orifices circumferentially extending around a periphery of at least a portion of the second relief valve.

6. A valve body, comprising:
a work passage;
a high-pressure channel fluidly connected to the work passage;
a tank passage; and
a cavity disposed between the high-pressure channel and the tank passage, the cavity fluidly connecting the high-pressure channel and the tank passage, the cavity including:
   a first portion within which a relief valve threadedly engages;
   a second portion disposed adjacent to the high-pressure channel; and
   an annulus at least partly disposed between the first portion and the second portion, the annulus fluidly connected to the tank passage, and wherein a surface area of the relief valve exposed to the annulus is at least two times greater than a cross-sectional area of the high-pressure channel.

7. The valve body of claim 6, wherein the annulus circumferentially extends around the relief valve.

8. The valve body of claim 6, wherein the relief valve includes a cage, and the second portion of the cavity includes a diameter that is substantially equal to a diameter of the cage.

9. The valve body of claim 6, wherein:
the annulus includes a cross-sectional area defined at least in part by a first area and a second area, wherein the first area and the second area are diametrically opposed areas around the annulus on opposing sides of the relief valve; and
the cross-sectional area of the annulus is greater than at least twenty-five percent of the cross-sectional area of the high-pressure channel.

10. The valve body of claim 6, wherein the annulus includes a cross-sectional area that circumferentially extends around the relief valve, the cross-sectional area of the annulus being greater than the cross-sectional area of the high-pressure channel.

11. The valve body of claim 6, further comprising:
an additional work passage;
an additional high-pressure channel fluidly connected to the additional work passage;
an additional tank passage; and
an additional cavity disposed between the additional high-pressure channel and the additional tank passage, the additional cavity fluidly connecting the additional high-pressure channel and the additional tank passage, the additional cavity including an additional annulus, wherein the additional cavity is configured to receive an additional relief valve, and a surface area of the additional relief valve exposed to the additional annulus is greater than a cross-sectional area of the additional high-pressure channel.

12. The valve body of claim 11, wherein at least one of:
the additional annulus includes a first cross-sectional area defined at least in part by a first area and a second area, wherein the first area and the second area are diametrically opposed areas around the additional annulus on opposing sides of the additional relief valve, and the first cross-sectional area of the additional annulus is greater than at least twenty-five percent of the cross-sectional area of the additional high-pressure channel; or
the additional annulus includes a second cross-sectional area that circumferentially extends around the additional relief valve, the second cross-sectional area of the annulus being greater than the cross-sectional area of the additional high-pressure channel.

13. The valve body of claim 11, wherein one of a cage or a poppet is configured to reside at least partially within the second portion of the cavity.

14. The valve body of claim 6, wherein:
the work passage fluidly connects to a pump and a hydraulic line for providing pressure fluid; and
the high-pressure channel fluidly connects to the work passage, at a location between the pump and the hydraulic line.

15. A valve assembly, comprising:
an attachment point for a hydraulic line;
a valve; and
a valve body defining:
a work passage fluidly connected to the attachment point;
a cavity fluidly connected to the work passage via a high-pressure channel, the cavity including an annulus; and
a tank passage fluidly connected to the cavity via the annulus, wherein the valve is disposed in the cavity such that a surface area of the valve is exposed to the annulus, wherein the surface area of the valve exposed to the annulus is at least two times greater than a cross-sectional area of the high-pressure channel.

16. The valve assembly of claim 15, wherein the cavity further defines:
a first portion in which the valve threadedly engages;
a second portion engaged with a cage or a poppet of the valve; and
the annulus is interposed between the first portion and the second portion.

17. The valve assembly of claim 15, wherein:
the annulus includes a cross-sectional area defined at least in part by a first area and a second area, wherein the first area and the second area are diametrically opposed areas around the annulus; and
the cross-sectional area of the annulus is greater than at least twenty-five percent of the cross-sectional area of the high-pressure channel.

18. The valve assembly of claim 15, wherein the annulus includes a cross-sectional area that circumferentially extends around the valve, the cross-sectional area of the annulus being greater than the cross-sectional area of the high-pressure channel.

19. The valve assembly of claim 15, wherein:
the tank passage is configured to fluidly connect to a tank;
at least one of:
the valve provides makeup flow from the work passage to the tank via the tank passage; and
the valve provides relief flow from the tank to the work passage via the tank passage.

20. The valve assembly of claim 15, wherein the high-pressure channel is oriented substantially orthogonal to the tank passage.

* * * * *